United States Patent [19]

Tervo

[11] Patent Number: 5,056,557
[45] Date of Patent: Oct. 15, 1991

[54] BUTTERFLY-TYPE CHECK VALVE

[75] Inventor: John N. Tervo, Scottsdale, Ariz.

[73] Assignee: Allied-Signal Inc., Morris Township, Morris County, N.J.

[21] Appl. No.: 665,391

[22] Filed: Mar. 6, 1991

[51] Int. Cl.⁵ .............................................. F16K 15/03
[52] U.S. Cl. ................................ 137/527.8; 251/308; 251/218
[58] Field of Search ............................ 137/527, 527.8; 251/305, 308, 218

[56] References Cited

U.S. PATENT DOCUMENTS 2,641,485  6/1953  Dupuy .............................. 251/149.2
4,964,422 10/1990  Ball ................................. 137/527 X Primary Examiner—Robert G. Nilson
Attorney, Agent, or Firm—Joseph R. Black; James W. McFarland; Robert A. Walsh

[57] ABSTRACT

The invention is a butterfly-type check valve (8) wherein the valve plate (18) moves translationally relative to a pivot axis (90) and incident to its own rotational movement. The invention employs biasing means (102, 104, 108) for initiating movement of the valve plate when the latter is at a closed rotational position, thereby eliminating the need for a pilot valve.

9 Claims, 3 Drawing Sheets

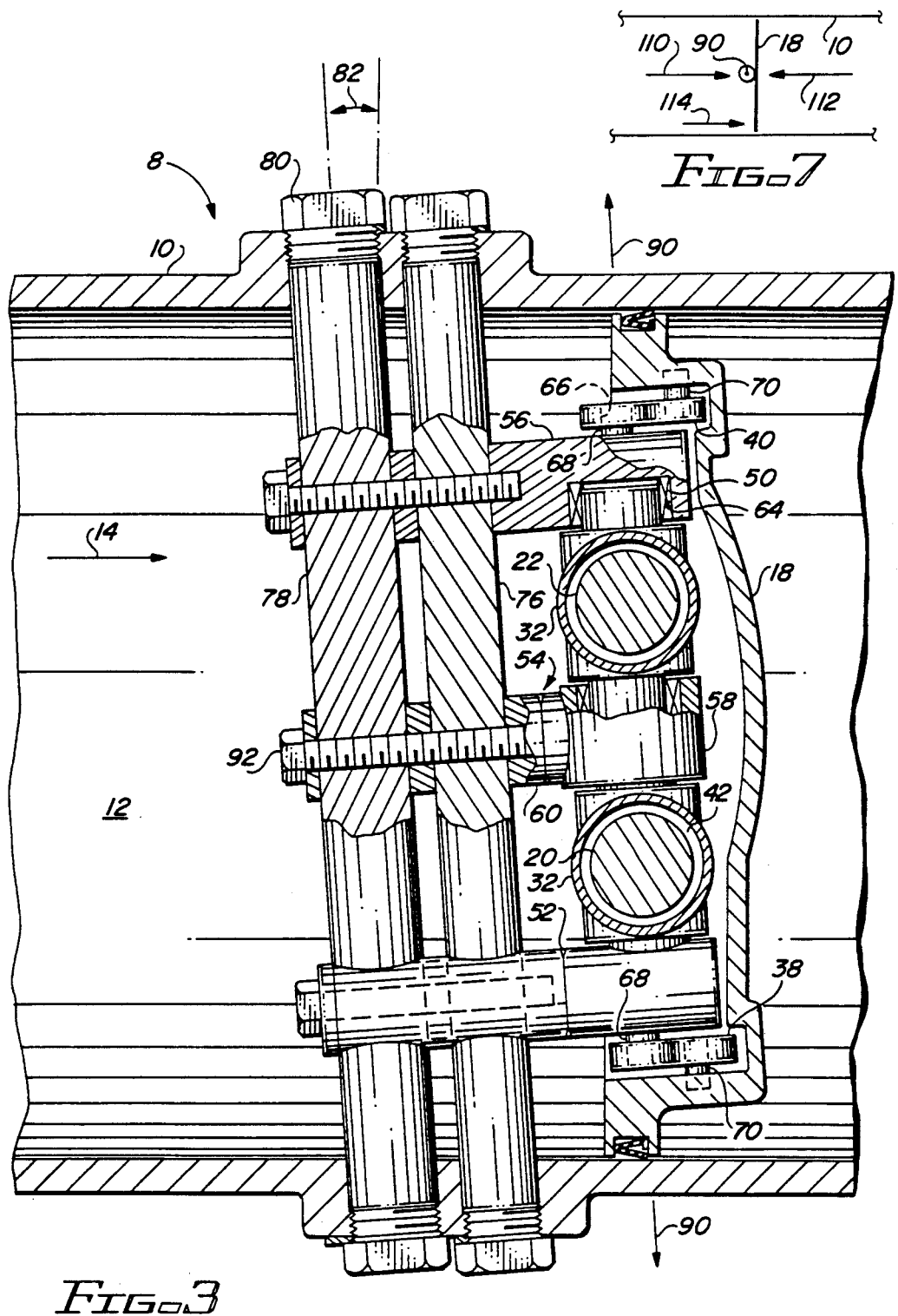

BUTTERFLY-TYPE CHECK VALVE

TECHNICAL FIELD

The present invention relates generally to a butterfly-type check valve. More specifically, the invention relates to a butterfly-type check valve which is operative to effect translational movement of the valve plate relative to a pivot axis and incident to rotational movement of the plate.

BACKGROUND OF THE INVENTION

U.S. Pat. No. 2,641,485 discloses a valved pipe fitting comprising a rotationally-based valve plate 60. The valve plate 60 has lugs 64 through which apertures 66 are formed. The plate is biased by a coil spring having outwardly projecting arm portions 68,70 which engage the apertures 66 so that the coil spring also serves as a pivot element for the valve plate. The coil spring in said to operate in two modes, either biasing the valve plate 60 to a closed position or maintaining the same in a fully open position.

To applicant's knowledge, the only reference that discloses a check valve of the above description is U.S. Pat. No. 4,964,422 Ball et al.

This invention addresses two concerns presented by the structure illustrated in the '422 patent. The first concern is that the rack and pinion arrangement disclosed therein raises the potential for mechanical binding. The second concern is that the use of a pilot valve may be undesirable in many applications for two reasons. The first reason is that in applications which do not permit leakage, a sealing arrangement must be provided for the pilot valve as well as the main valve. The second reason is that in applications characterized by high back-pressure, the pilot valve may (depending on its design and composition) be closed violently, thus presenting the additional concerns of wear, damage, and noise.

SUMMARY OF THE INVENTION

The invention is a butterfly-type check valve wherein the valve plate moves translationally relative to a pivot axis and incident to its own rotational movement. The invention employs biasing means for initiating movement of the valve plate when the latter is at a closed rotational position, thereby eliminating the need for a pilot valve.

DESCRIPTION OF THE DRAWINGS

FIG. 3 is a partially cross-sectional and partially elevational view taken along line 3—3 of FIG. 1.

FIG. 7 is a schematic view of a butterfly-type check valve. The drawing includes vectors to illustrate the use of a biasing mechanism to effect initial opening of the valve.

DESCRIPTION OF THE PREFERRED EMBODIMENT

Figure 1:
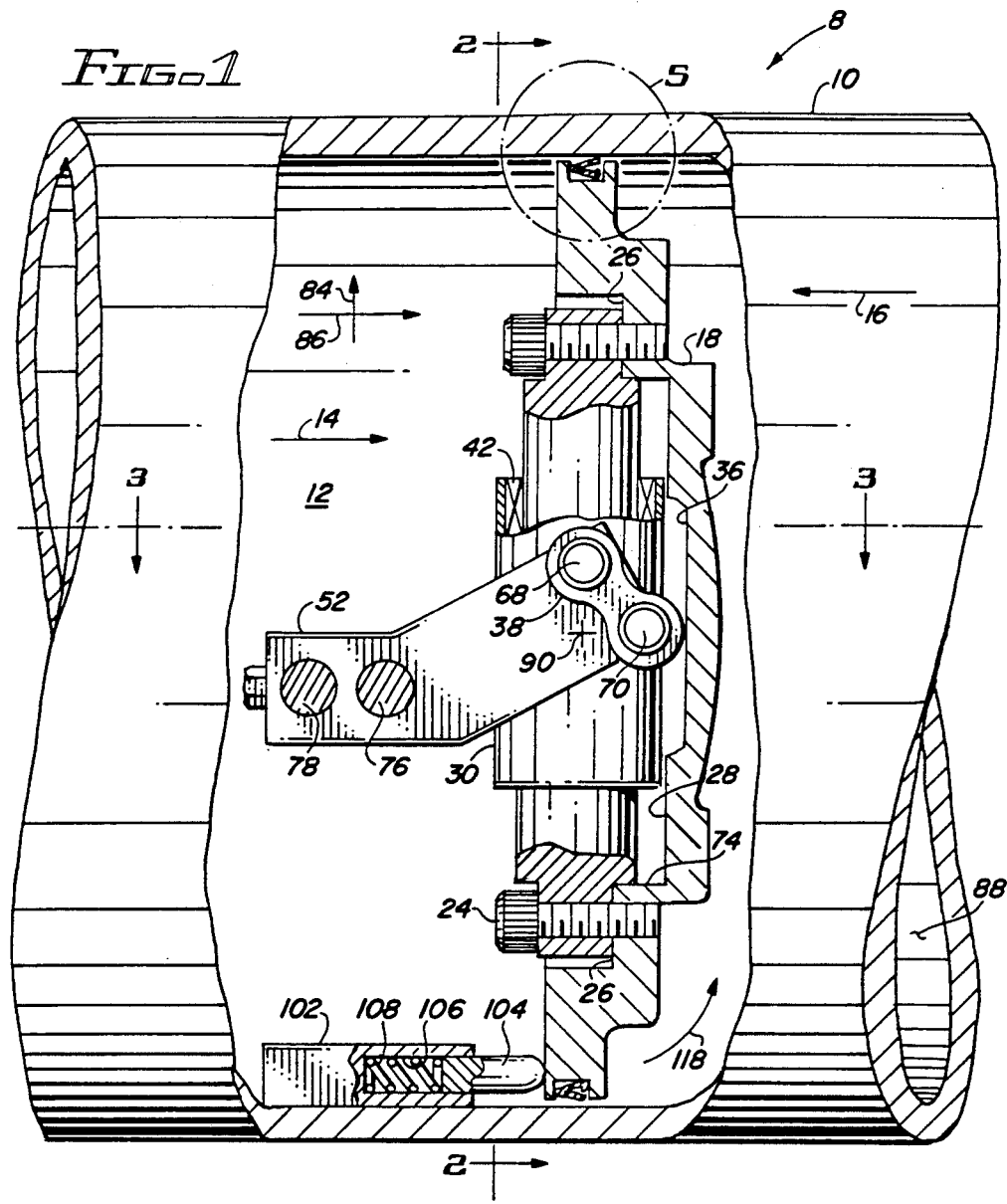
FIG. 1 is a generally cross-sectional and partially elevational view of a butterfly-type check valve, taken along broken line 1—1 of FIG. 2.
Figure 4:
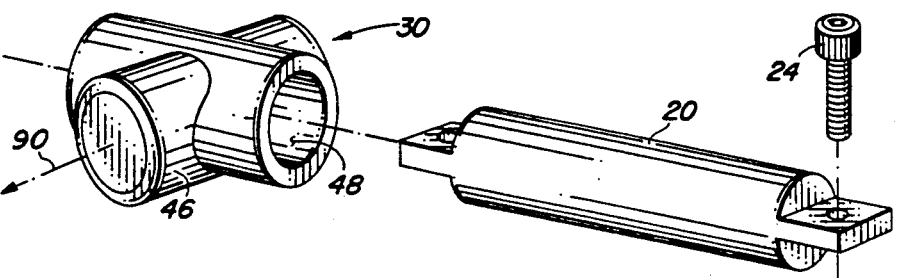
FIG. 4 is a perspective view of a trunnion member and an operatively associated rod.
Figure 2:
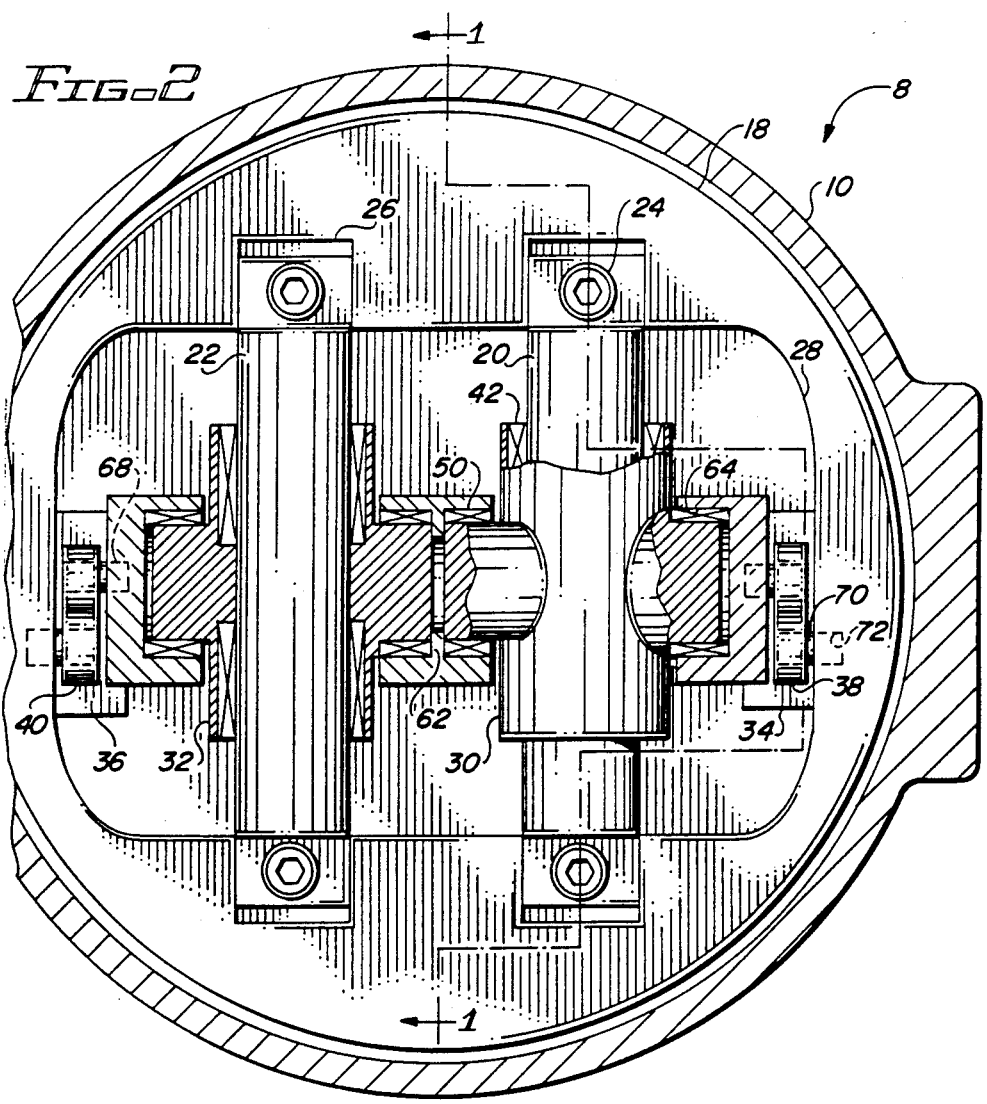
FIG. 2 is a partially cross-sectional and partially elevational view taken along line 2—2 of FIG. 1.

Referring to FIGS. 1 and 2 of the drawings, a mounting body or flow body 10 defines a flow path 12 extending therethrough. Arrow 14 indicates the direction of desired flow, whereas arrow 16 indicates the direction of checked pressure. A valve plate assembly is formed by a valve plate 18 and two guide rods 20, 22. The rods, which can be hollow rather than solid, have flattened ends as indicated in FIG. 4, and are rigidly secured to the valve plate 18 by bolts 24 extending through each end and into tapped bores formed in the plate. The valve plate 18 has first recesses 26 providing lands for the rods 20, 22, a second recess 28 providing clearance for two trunnion members (hereinafter "trunnions") 30, 32, and two deeper recesses 34, 36 providing clearance for two link members 38, 40 (hereinafter, "links"). Each of the rods 20, 22 extends through an operatively associated one of the trunnions 30, 32. Cylindrical bearings (as at 42) are provided to facilitate sliding movement of the rods relative to the trunnions. The trunnions (as at 30) have first and second transverse cylindrical portions 44, 46, and the first portion has a bore 48 (FIG. 4) formed therethrough to receive the associated bearing 42 and rod 20. Each end of each second cylindrical portion 46 (FIG. is pressed into the inner race of an operatively associated bearing (as at 50).

Referring now to FIG. 3, the outer race of each bearing 50 is pressed into an operatively associated one of three support members 52, 54, 56. The center support member 54 has a generally tubular portion 58 and a bent cylindrical portion 60, the tubular portion having an inner annular boss 62 (FIG. 2) which serves as a spacer for its operatively associated bearings 50 and trunnions 30, 32. The outer support members 52, 56 are bent cyclinders having transverse bores 64, 66 formed therein to receive respective bearings 50 and trunnion portions 46 from the inward-facing side, and pins (as at 68) from the outward-facing side. The longitudinal axes of the pins 68 are aligned with the pivot axis 90, as determined in the direction indicated by the arrow 86, which should be viewed as extending into the sheet of the drawing at an angle of about four degrees.

Referring again to FIGS. 1 and 2, the pins 68 extend from the links 38, 40. An additional pair of pins (as at 70) extend from the links and are pressed into bores (as at 72) formed in the valve plate 18. When the valve plate 18 is at the closed rotational position, the longitudinal axes of the pins 70 are aligned with the pivot axis 90, as determined in the direction indicated by the arrow 84. The bores 72 extend into a wall 74 formed incident to the formation of the second recess 28. Needle bearings (not shown) are provided between the links and pins.

Referring back to FIG. 3, the above-described assembly is positioned in the flow path 12 and supported by fourth and fifth support members 76, 78 (FIG. 3). The latter support members extend through bores formed through the flow body 10 and the remaining support members 52, 54, 56, as indicated. The ends of the fourth and fifth support members project from the flow body 10 and are threaded to receive nuts (as at 80), or are otherwise rigidly secured to the flow body. These support members 76, 78, or their equivalent, extend across the flow path 12 at an angle 82 of about four degrees from a line 84 perpendicular to the longitudinal direction 86 of the path. This offset geometry is a known expedient for preventing interference between the circumferential edge of the valve plate 18 and the inner, circular-cylindrical surface 88 (FIG. 1) of the flow body. It should also assist in permitting a limited range of translational movement of the plate relative to the pivot axis 90 (FIG. 4), although selective shaping of the inner surface 88 may still be needed to accommodate the required range of translational movement, especially in applications which demand a complete seal at the closed position of the plate 18.

The support members 52, 54, 56, 76, 78 collectively form a support assembly, the purpose of which is to properly orient and support the valve plate 18 for pivotal movement in the flow path 12. Accordingly, the fourth and fifth support members 76, 78 are provided to secure the remainder of the support assembly to the flow body 10 while preventing movement of the support assembly. Rotational movement of the entire support assembly is prevented by providing both of the fourth and fifth members 76, 78. However, it is clear that only one such member is needed, provided that rotational movement of the same about its own longitudinal axis is prevented. For example, a single member of square cross-section would suffice. As illustrated, the support members 52, 54, 56, 76, 78 are suitably bored and tapped to accommodate intersecurement by bolts (as at 92).

Figure 5:
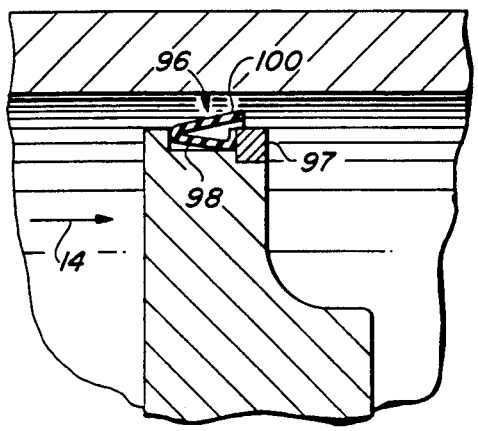
FIGS. 5 and 6 are partial cross-sectional views illustrating a circumferential sealing arrangement.
Figure 6:
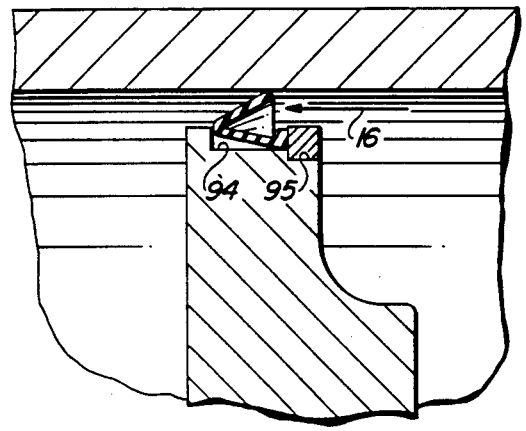

FIGS. 5 and 6 illustrate the currently preferred sealing arrangement. The valve plate 18 has two annular recesses 94, 95 formed in its circumferential edge. An annular V-seal 96 (obtainable from such sources as Furon of Los Alamitos, Calif.) is retained on the recess 94 by a retainer 97 which in turn is retained on the angled second recess 95 by shrinkage. One leg 98 of the V-seal is entrapped. The other leg 100 is flexible about the apex of the seal, and is normally in the position illustrated in FIG. 5. Accordingly, the leg 100 has negative resistance to pressure exerted in the direction 14 of desired flow if the seal is positioned as illustrated in FIG. 6. However, as the valve plate 18 returns to its closed position in response to back-pressure, the leg 100 is flexed in a radially outward direction, and is pressed against the inner surface 88 (FIG. 1) by the checked pressure 16.

Returning to FIG. 1, a piston housing member 102 having an arcuate bottom surface (not shown) conformal with the inner surface 88 of the flow body 10 is rigidly secured to the latter at a bottom-centered position. A piston 104 is slidably disposed in a bore 106 formed in the housing member, and a spring 108 is secured to and interposed in compression between the piston and the bottom of the bore. The spring 108 is maximally compressed when the valve plate 18 is at the illustrated closed position. (NOTE: Although the drawings indicate that the plate is oriented at zero degrees relative to the axis 84 shown in FIG. 3, that angle is not quite reached at the closed position).

Referring now to the schematic drawing of FIG. 7, arrows 110, 112, 114 are force vectors representing the center of unchecked pressure, the center of checked pressure, and the biasing force exerted by the piston 104, respectively, when the valve plate 18 is at the closed position. The pivot axis 90 is centered in the flow path, and at the closed position the valve plate 18 does not quite reach the zero angle, as noted above. Accordingly, when the valve 8 is checking, the force 112 is exerted at a point just below the pivot axis. Although this force 112 is relatively large compared to the biasing force 114, its associated moment arm is relatively small and the forces 112 and 114 balance or, with the presence of the seal 96, the sum of the associated friction force and the biasing force 114 balance the checking force 112. The force 110 is absent when the valve 8 is checking. When pressure is reversed, the force 112 is absent and the force 110, also exerted just below the pivot axis 90, cooperates with the biasing force 114 so that the plate 18 pivots to an open position.

It will be understood that numerous structural equivalents could be used in place of the illustrated piston/spring arrangement. A rotationally-biased traction wheel mounted on and carried with the valve plate 18 should be workable, for example.

Referring now to FIGS. 1, 2, 3, and 7, when the valve plate 18 opens it rotates in the direction indicated by the arrow 118.

Rotational torque is transmitted through the rods 20, 22 to the bearings 42 and trunnions 30, 32, which rotationally move relative to the stationary support members 52, 54, 56, but which rotationally move with the valve plate 18. As the plate 18 rotates from the closed position it applies force on the links 38, 40 via the pins 70 in the direction 86. The force exerted in the direction 86 has a rotational component exerted on the pins 70 in a direction perpendicular to the longitudinal axes of the links 38, 40, and that component tends to rotate the links about the fixed longitudinal axes of the pins 68. The force exerted in the direction 86 also has a translational component that tends to move the valve plate 18 in a downward direction (as viewed in FIG. 1) parallel to the longitudinal axes of the rods 20, 22. Accordingly, as the plate 18 rotates, the links 38, 40 and pins 68, 70 cooperate with the plate and support members 52, 56 to translationally move the plate relative to the pivot axis 90, and the latter movement is guided by the trunnions 30, 32. In accord with the teaching of the above-referenced '422 patent, the translational movement increases the fluid-exerted torque on the plate, and the latter continues to translate and rotate. This movement continues until the longitudinal axes of the links 38, 40 are substantially parallel to the rods 20, 22. The movement is reversed in response to pressure associated with transitory back-flow. Note that the range of translational movement is limited to some multiple of the distance between the longitudinal axes of the pins 68, 70.

The foregoing portion of the description, which includes the accompanying drawings, is not intended to restrict the scope of the invention to the preferred embodiment thereof or to specific details ancillary to the teaching contained herein. Thus, the invention should be construed as broadly as is consistent with the following claims and their equivalents.

I claim:

1. A butterfly-type check valve, comprising in combination:
   a flow body forming a flow path extending therethrough;
   a support member secured to the flow body and extending across the flow path;
   a valve plate secured to the support member such that the plate is movable in a first rotational direction away from a position closing fluid communication along the flow path, and in an opposite second rotational direction toward the position, and such that the valve plate moves translationally incident to rotational movement in each of the two directions, the translational movement occurring in directions substantially parallel to the valve plate, whereby the valve is structurally adapted to be operative in response to fluid flow in a first flow direction along the path to move the plate translationally and rotationally toward the position, and is operative in response to fluid flow in an opposite flow direction along the path to move the plate translationally and rotationally away from the position; and biasing means for cooperating with fluid pressure exerted on the valve plate in the opposite flow direction to initiate movement of the plate in the first rotational direction.

2. The invention of claim 1 wherein the biasing means comprises a spring-biased piston.

3. The invention of claim 2 wherein the biasing means further comprises a mechanical spring.

4. The invention of claim 1 wherein the biasing means comprises a housing member rigidly secured to the flow body.

5. The invention of claim 4 wherein the biasing means further comprises a piston slidably disposed in the housing member and a spring operatively associated with the piston and disposed in the housing member.

6. The invention of claim 1 further comprising means secured to both the plate and the support member for translationally moving the plate incident to the rotational movement.

7. The invention of claim 6 wherein the moving means comprises two mechanical links pivotally secured to both the valve plate and the support member.

8. The invention of claim 6 wherein the biasing means comprises a housing member rigidly secured to the flow body.

9. The invention of claim 8 wherein the biasing means further comprises a piston slidably disposed in the housing member and a spring operatively associated with the piston and disposed in the housing member.

* * * * *